United States Patent [19]

Buchman et al.

[11] Patent Number: 5,778,240
[45] Date of Patent: Jul. 7, 1998

[54] REFERENTIAL EDIT CHECKING TABULAR FORM DATA

[76] Inventors: David Alan Buchman, 186 Temple Hill Rd. Unit 1616, New Windsor, N.Y. 12553; Kevin William Hall, 42 Sunnybrook Cir., Highland, N.Y. 12528

[21] Appl. No.: 764,967

[22] Filed: Dec. 13, 1996

Related U.S. Application Data

[63] Continuation of Ser. No. 286,097, Aug. 4, 1994, abandoned, which is a continuation of Ser. No. 986,000, Dec. 4, 1992, abandoned.

[51] Int. Cl.$^6$ .................................................. G06F 3/00
[52] U.S. Cl. .................... 395/792; 395/766; 395/770
[58] Field of Search ............................. 395/766, 768, 395/770, 792, 793, 796, 334, 340, 347, 352, 50, 52

[56] References Cited

U.S. PATENT DOCUMENTS

| | | | |
|---|---|---|---|
| 4,334,286 | 6/1982 | Kerigan et al. | 395/155 |
| 4,455,619 | 6/1984 | Masui et al. | 395/160 |
| 4,520,457 | 5/1985 | Hagler et al. | 395/155 |
| 4,891,771 | 1/1990 | Edel et al. | 395/148 |
| 5,033,009 | 7/1991 | Dubnoff | 395/148 |
| 5,040,131 | 8/1991 | Torres | 395/156 |
| 5,175,810 | 12/1992 | Young et al. | 395/148 |
| 5,208,907 | 5/1993 | Shelton et al. | 395/155 |
| 5,230,040 | 7/1993 | Yamashita | 395/148 |
| 5,247,611 | 9/1993 | Norden-Paul et al. | 395/161 |
| 5,280,575 | 1/1994 | Young et al. | 395/148 |
| 5,367,619 | 11/1994 | Dipaolo et al. | 395/149 |

OTHER PUBLICATIONS

Programming with dBASE III PLUS, Borland International Inc., 1985, 1991, pp. P10–1 through P10–4 and P7–8.
Learning dBASE III PLUS, Borland International Inc., 1985, 1991, pp. L9–26 through L9–28.
dBASE BRIDGE/dBASE III PLUS, Borland International Inc., 1985, 1991, pp. B2–12.
Alpha Four Reference Manual, 1989 pp 10–1 to 10–33.
Microsoft Access Relational Database Management System for Windows User's Guide, 1992, pp. 115–130.

*Primary Examiner*—Almis R. Jankus
*Assistant Examiner*—Stephen Hong

[57] ABSTRACT

Checking and verifying entries made in tabular form data, such as found in a database or spread sheet, is provided through the specification of two descriptive files: an edit profile and a referential edit profile, which is an edit profile which refers to another field in the tabular data. These files, or their in-memory equivalents, permit an end user to flexibly specify allowable contents for tabular form data in one field based upon the contents of another field (or synonymously, another column). In short, the present invention provides a system and method for what is referred to herein as referential edit checking of tabular form data.

5 Claims, 3 Drawing Sheets

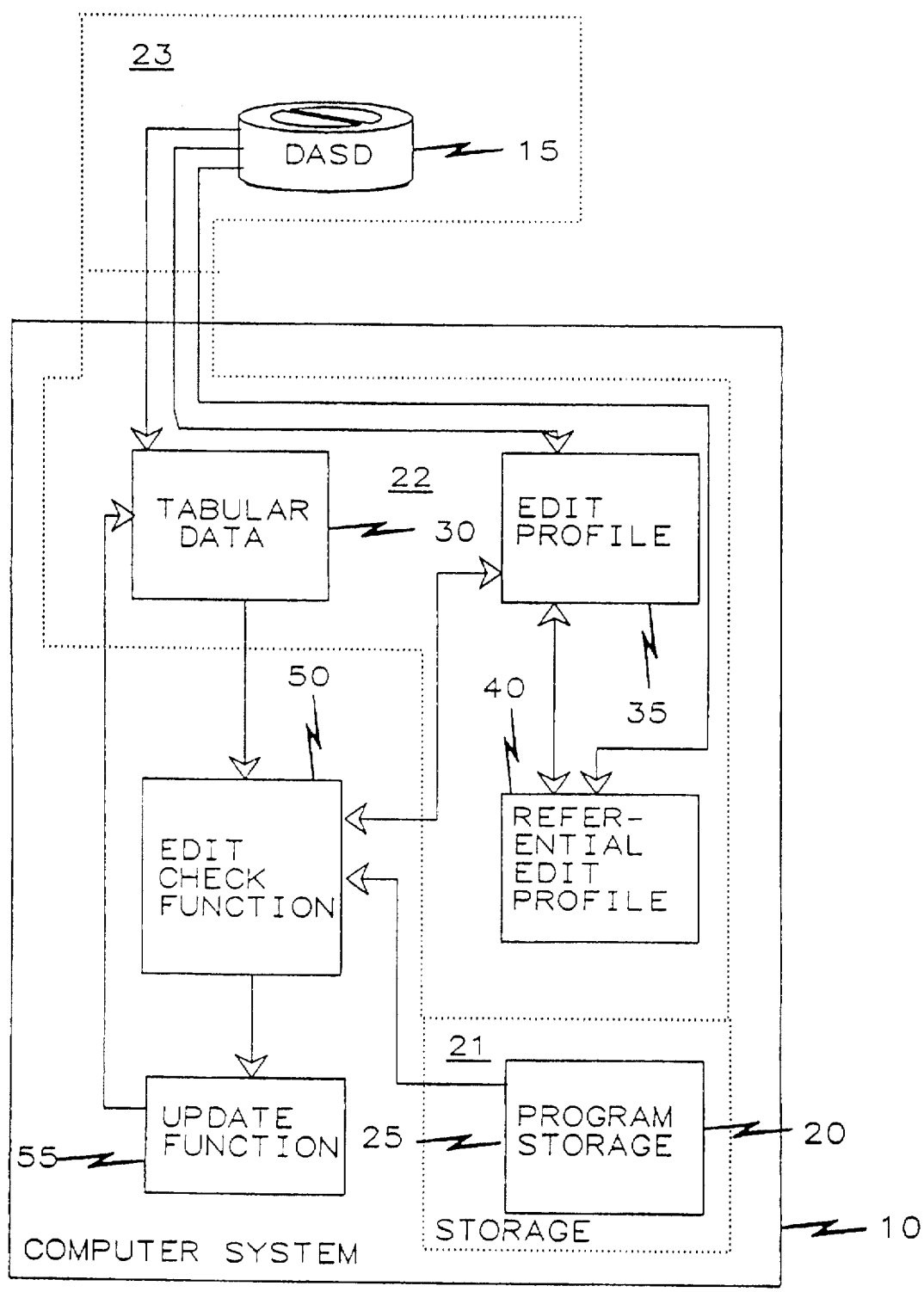

REFERENTIAL EDIT CHECKING TABULAR FORM DATA

"This application is a continuation of application Ser. No. 08/286,097 filed Aug. 4, 1994, which is a continuation of application Ser. No. 07/986,000 filed Dec. 4, 1992, now abandoned".

BACKGROUND OF THE INVENTION

The present invention is generally directed to a computer based method for editing data arranged in tabular form. More particularly, the present invention is directed to a system and method for controlling the entry and/or loading of data arranged in tabular form based upon user definable cross references to values contained within other specified columns of the tabular data so as to particularly enhance verification and/or validity checking. Even more particularly, the present invention is seen to be useful in providing edit checking capabilities for data base and spread sheet systems which manage, process, store and display tabular data.

In recent years, it has been seen that the utilization of both spread sheet and data base mechanisms for storing and processing data have become very important in the business world, and even in the scientific world, though to the lesser extent. Part of the value of such systems is their ability to display requested information on a computer screen, or to provide printed versions of selected data in a tabular format.

Many of the existing spread sheet and data base processing systems exhibit certain desirable features. For example, if a field in a data base represents a zip code, then it is possible to provide an edit checking mechanism which only permits the digits 0 through 9 to be entered into the zip code field. Such mechanism are usually referred to as edit masks. Thus by controlling an edit mask, users are permitted to select appropriate character entries for the field, even for example the extent of including the hyphen or the minus sign that might be present in a nine digit zip code in the so-called "zip plus four" format.

There are yet other capabilities that are for the end-user provided by both data base management and spread sheet systems. In particular, it is possible to have the results in one column being a function of another column. For example, a first column might include selling prices. Another column, perhaps labeled "sales tax" would contain values that were a constant multiple of the entries in the selling price column, the multiple being the sales tax rate. It is noted that while there is a functional relationship between the value in one column which is dependent upon the value in another column, there is no edit checking mechanism for the second or sales tax column. If there is any edit checking mechanism at all employed at all for the second column, it is defined independently of other columns.

While the above illustrates the possibility of a simple function relationship between the elements in a first column and the elements in a second column, there are yet other more complicated relationships which may be established between elements occurring in different columns. In particular, it is possible in some data base management systems to employ implicitly defined conditional relationships. For example, in those situations where an income tax rate is a function of the range in which an income value lies, it is possible to make the tax appearing in a derived column dependent upon the particular range in which an income value lies. This would naturally be carried out by means of a conditional (IF ... THEN) statement where tests are made of the income value to determine what range it lies in. However again, even in these complicated relationships between columnar entries, there is no edit checking performed for the derived column. If needed, any editing aspects related to the derived column will have already been defined by the user. There are yet other more complicated relational connections that may exist between different columns in a data base, or even in a spread sheet data structure. For example, the value presented in an identified column or field may be used as a search key in another data base or table which is employed to link the specified value to a value contained in the second data base or table. In this fashion, a detailed functional relationship may be established between the elements in a second column as a function of element values occurring in a first column. However, again, it is noted that these system features do not provide a mechanism for edit checking in the second column. More particularly, with specific reference to the present invention, there is no mechanism provided for edit checking in a specified column which is any way dependent upon the value that occurs in another column. Nonetheless, it is this feature which is supplied by applicants' invention. In particular, it is noted that the edit checking that is provided is not per se dependent only on the identification of another field or column in the table, but rather is actually dependent upon values contained in the field or column. It should also be appreciated that the system and method of the present invention is operable independently of any application program that has defined a data base in tabular form. Examples and applications of the utility of the present system are described below.

For the purpose of providing appropriate background and definitional information, it is noted that when reference is made to data base structures, the tabular structure is usually one in which there are a plurality of records, wherein each record includes a number of fields. The records are often thought of as being rows and the fields as being columns. Each column is generally associated with a field name and the rows are usually referred to using a record number. In spread sheet systems, the tabular data is usually described as being in an array of cells wherein each cell is identified by a column which typically possesses an alphabetic designation and wherein each row is referred to by number and wherein each cell is thus referenced to a row number and column heading. However, for the purpose of the present invention these two tabular form data structures are considered to be the same. Additionally, it is noted that while a tabular data structure is usually referred to in terms of rows and columns, it is quite possible in some circumstances for the role of rows and columns to be interchanged. Accordingly, it would have been just as easy for the present applicants to refer to rows as being a first dimension and columns as being a second dimension. However, doing so would neither enhance the readability or understanding of applicants' description. Additionally, the present invention is naturally extendable to 3-D spread sheet and data base structures. Accordingly, applicants do not wish the claims below to be limited in the ways described. Accordingly, as used herein and in the appended claims, the terms "row" and "column" or "record" and "field" refer merely to two distinct dimensions for data arranged in tabular form.

It is also noted that the method of the present invention while particularly developed in the context of a relational data base, does not require such an environment for its operation.

SUMMARY OF THE INVENTION

The present invention provides a method and system for checking the correctness of values in tabular form data in such a manner that conditions for correctness are dependent on values in another column of data in the same row. The present invention allows relationships to other columns to exist and, more beneficially for the user, permits correctness conditions to be described in a separate edit profile file. The edit profile file references the interdependent (referential) conditions and other forms of checking. The present invention removes problems associated with correctness checking (edit checking) for data arranged in a tabular format. The present invention removes the limitation of systems in which edit checking exists solely for data that is placed in a particular column without reference to data that might exist elsewhere in the table or file. Means are provided for the carrying out of this functionality in a stored program computer processing system.

In accordance with an embodiment of the present invention a method for managing tabular form data in a computer system comprises storing tabular data so as to be able to access individual rows of data which include data from multiple columns. An edit profile is defined in computer storage. Modification, validation or entry of data into the tabular structure in a selected row and column is controlled in accordance with at least one value from another column of the tabular data in a manner which is specified directly or indirectly by the edit profile.

In particular, in the present invention the user and/or owner of the data base system and/or the relevant data may additionally supply a linkage or cross reference to a referential editing file whose entries define specific limitations for each column which is indicated as being controlled by the editing mechanism of the present invention.

In accordance with yet another embodiment of the present invention, a method is provided for controlling the contents of a computer memory. This method comprises storing, in a first portion of a computer memory, tabular form data which is retrievable by the specification of row and column indices. In a second portion of the computer memory, edit profile data is stored. This profile data links at least one column of the tabular data to user definable edit specifications which control the editing of the contents of tabular data elements in a specified row and column in accordance with the value stored in the linked column. Accordingly, editing of the contents of the specified tabular data element is carried out under control of the edit profile in a flexible manner which is definable by the user but which may also be defined by the owner of the data and/or the owner or developer of the application program system which is most closely connected to the present invention, namely, data base management and spread sheet programming systems.

Accordingly, it is an object of the present invention to enhance features and capabilities associated with data base management systems and also with spread sheet data processing systems.

It is yet another object of the present invention to provide both data base owners and users with the additional features associated with the capability of edit checking data in one field, in an automatic fashion, based upon the user specified profile data in order to provide consistent, accurate and automatic generation of data in a useable format.

It is a still further object of the present invention to provide a method for controlling the contents of computer memory systems so that editing operations on tabular data stored therein are more likely to be free of error.

Lastly, but not limited hereto, it is an object of the present invention to provide users of computer systems with more flexible editing capabilities, particularly when tabular form data is being either modified or entered, and even more particularly when that entry is being employed in conjunction with the utilization of data base or spread sheet application programs.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 2, is a block diagram illustrating the flow of information and structural organization of computer system elements which take part in the operation of the present invention.

DESCRIPTION OF THE INVENTION

Figure 1A:
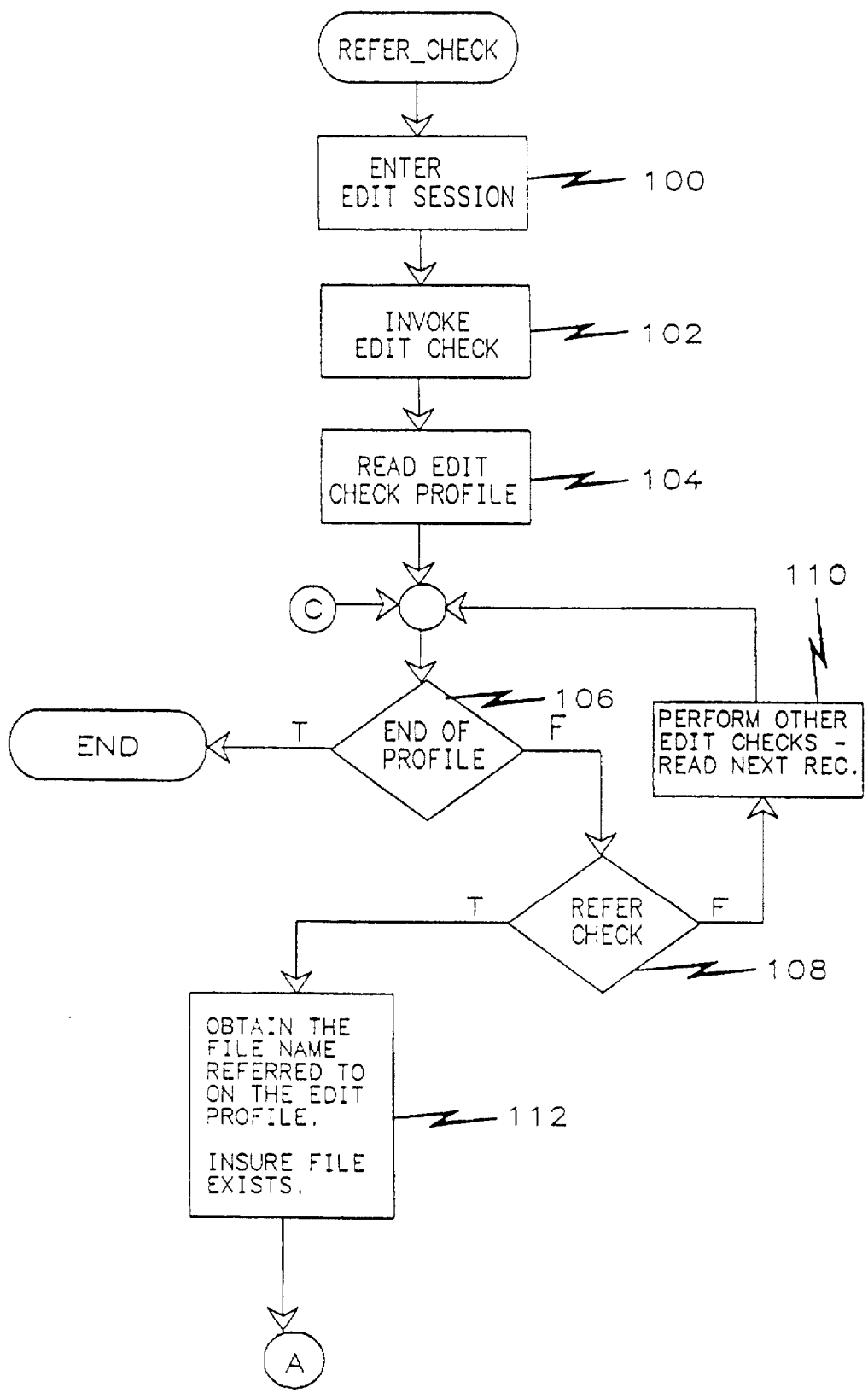
FIGS. 1A and 1B are two parts of a flowchart which illustrate the operation of the present invention.

In the operation of the present invention, a method is provided for checking the correctness of values in a tabular column of data such as for example might be found within the tables of a relational data base. Correctness checking is dependent upon the values found in another column of data on the same row. This method allows for relationships to other columns and conditions for correctness of a tabular data element to be described in a user definable profile file. The profile file describes a variety of interdependent (referential) conditions and additionally can describe other, more traditional forms of checking. It is however important to appreciate that in the present invention the operation and features are related to and directed to edit checking. This is an activity that is carried out when data is entered and/or when data is reloaded. The method of the present invention should be clearly distinguished from other data base activities and features. In particular, it is known, as described above, to have one column of data dependent upon another column of data. However, the present invention goes beyond that schema and provides a mechanism for data verification or validation upon entry. Furthermore, the present invention provides the establishment of substantially different criteria for verification based upon the value contained in a referenced cell. This is to be contrasted with other approaches to correctness checking for data in tabular form. In such cases, the correctness checking or edit checking exists solely for data that is placed in a particular column, without reference to data which might exist elsewhere in the table.

For example, consider the most basic form of edit checking. In this situation, an insert or an update to a table will fail if the data type entered into a particular field (column) does not match the column definition. For example, this might happen if one puts an alphabetic character in a field that is specified as being numeric.

The assignee of the present invention markets several products in the data base field. One of these products is called DB2, the other SQL/DS. Along with these relational data base products, applicants' assignee markets a program called "DBEDIT" which has advanced edit checking features, but which is lacking the capabilities of the present invention. DBEDIT creates a panel-driven interface between the user and the data base. When the panel definitions are made, certain data field tests can be defined by the creator of the panels. These tests can include defining a list of values against which correctness can be checked. These same checks can be built into any application or program panel that does data base updating operations. However, the limitations of these approaches becomes evident when the correctness of data in one column is dependent upon the contents of another column. Accordingly, the edit checking procedure described below provides the capability of performing tabular edit checking for data in one column in a data base (relational or otherwise) based upon values in another. This capability exists while the user is in a full screen edit environment. This invention also describes a process whereby the user may automatically set a default value in a column based upon a value in another column.

In preferred embodiments of the present invention, the method is implemented as part of a full screen editing environment. In such an environment, a full screen editor allows multiple row update information to be added to a data base with edit checking on some or all columns. In further accordance with an important aspect of the present invention, referential edit checking is employed but yet at the same time provides a mechanism for conventional editing capabilities. However, the present invention is unique since it allows checking of column values based on the values of another column referred to in the edit checks.

In the operation of the present invention, two files are typically employed. The first file is referred to herein as an edit profile and the second file is referred to as a referential edit profile. (However, it is possible for all necessary information to be contained in a single file.) The edit profile contains a description of which columns are to be checked and what the checks are. An example of an edit profile in accordance with the present invention is provided in Table I below:

TABLE I

| PLAN | CHAR | 4 | N | <REFER=PLAN REFREF |
|------|------|---|---|-------------------|
| SYS | CHAR | 4 | N | <REFER=SYS REFREF |
| EXTNAME | CHAR | 16 | N | <REFER=EXTNAME REFREF |
| ANAME | CHAR | 1 | N | <UPPER |
| CLUSTER | CHAR | 16 | N | <NOCHECK |
| INT | SMALLINT | 5 | N | <RANGE=10,20 |
| INTPRIME | SMALLINT | 5 | N | <NOCHECK |
| BITPRIME | SMALLINT | 5 | N | <LESS THAN 100 |
| SITE | CHAR | 3 | Y | <NOCHECK |

In the edit profile defined above, the first column lists column or field identifiers (names). The second column provides some basic edit information in that there is a mechanism for specifying whether or not the field is a character field or perhaps rather a field of small (2 byte long) integers. The next column in Table 1 provides a list of the sizes (in bytes) for the various fields in the table. In this particular case, the fourth column provides an indication of whether or not the column may contain one of null, blank or empty values. However, most importantly for the practice of the present invention, the fifth column contains the edit checking descriptions. The "<" sign specifies the start of the edit checking description. Most importantly for the present invention, the description is now focused on edit checking operations whose specification file is indicated by the presence of the word "REFER". Other edit checks are described as shown. For example, the designation "UPPER" in the field which is linked to the "ANAME" field is used to provide an indication that only upper case alphabetic characters are permitted in that field. Additionally, for the field labeled "CLUSTER" the edit profile specifies that no edit checking is carried out for this field entry. The other editing specifications are straightforward. For example, for the "INT" field name, the range of values in this particular tabular data element is checked and verified to make sure that it has a range from a high of 20 to a low of 10. While these edit specifications are readily appreciated by data base system designers, it is nonetheless important to understand these edit specifications since they are indirectly employable in a referential edit profile which provides the power, feature and flexibility associated with the method of the present invention.

In particular, attention is now directed to a specific example of a referential edit profile shown below in Table II:

TABLE II

| ANAME=S | <LIST=FP91,SP92 |
|---------|-----------------|
| ANAME=R | <LIST=FP92,SP93 |
| SYS=VM3 | <NOTLIST=SP92,FP92 |
| SYS=VM4 | <SET=SP93 |

The key word "REFER" as shown in Table I establishes a link between the edit checking specifications of Table I with the referential edit checking capabilities set out in the file in Table II. In particular, it is noted that the Table II is named "PLAN REFREF" and is referred to by that name in Table I (the edit profile) thus establishing a link between them. This linkage is established by the first line in Table I which establishes edit checking by reference to a separate file (hence the name referential edit checking). The key word "REFER" specifies when the edit checking facility is invoked, and the name of a file to use for this checking. These latter files being referred to as referential edit checking files.

The particular referential edit checking files shown in Table II provides the specifications for the referential edit checking to be carried out for the field called "PLAN" in the data base. The edit checker then references the file "PLAN REFREF" to see which of the columns need to be checked when checking the correctness of the cell in a specified row and column. In the particular case illustrated for the values shown in Table II, it is seen that the values in columns "ANAME" and "SYS" are referred to when checking the value in the "PLAN" field. Each line in the "PLAN REFREF" file is preferably implemented to provide disjunctive conditions. Correspondingly, the various lines in the referential edit checking file "PLAN "when taken together are preferably implemented so as to provide a conjunctive condition.

In the particular case shown, the first line in the "PLAN REFREF" file specifies that if the value in "ANAME" field is equal to "S" then the "PLAN" field (see Table I) must equal either "FP91" or "SP92" ("SP" or "FP" standing for spring plan or fall plan respectively). The first key word after the "<" in the referential edit checking file specifies that what follows is a list of values and that any one of which is appropriate for the "PLAN" field whenever the "ANAME" field is equal to "S".

In a similar manner, it is seen that if the "ANAME" field is equal to "R" then the "PLAN" field from Table I must contain either "FP92" or "SP93".

Other forms of referential edit checking are also provided. In particular, line 3 of Table II indicates that whenever the "SYS" field contains the value "VM3" then the value that is to be admitted into the "PLAN" field cannot be either "SP92" or "FP92". This is indicated by the key word "NOTLIST" that appears in line 3 of Table II. Other edit checks can follow accordingly and one can see the possibility of performing multiple edit checks on a single value based on values in other fields.

The last line shown in Table II is a special case. The "SET" command key word allows the user to automatically set the value in the target column, in this case the "PLAN" column or field to a user specified value based upon the value in a second column. In this case, the second column is the one named "SYS". In the example shown, when the value in the "SYS" column is "VM4" then the value in the "PLAN" field is set to "SP93" no matter what the current value is. Additionally, when the present edit checking method is performed through the use of a referential edit checking file and fails, the user is notified of the error and verification stops at that point. A valid value allows the checker to continue processing.

Figure 1B:
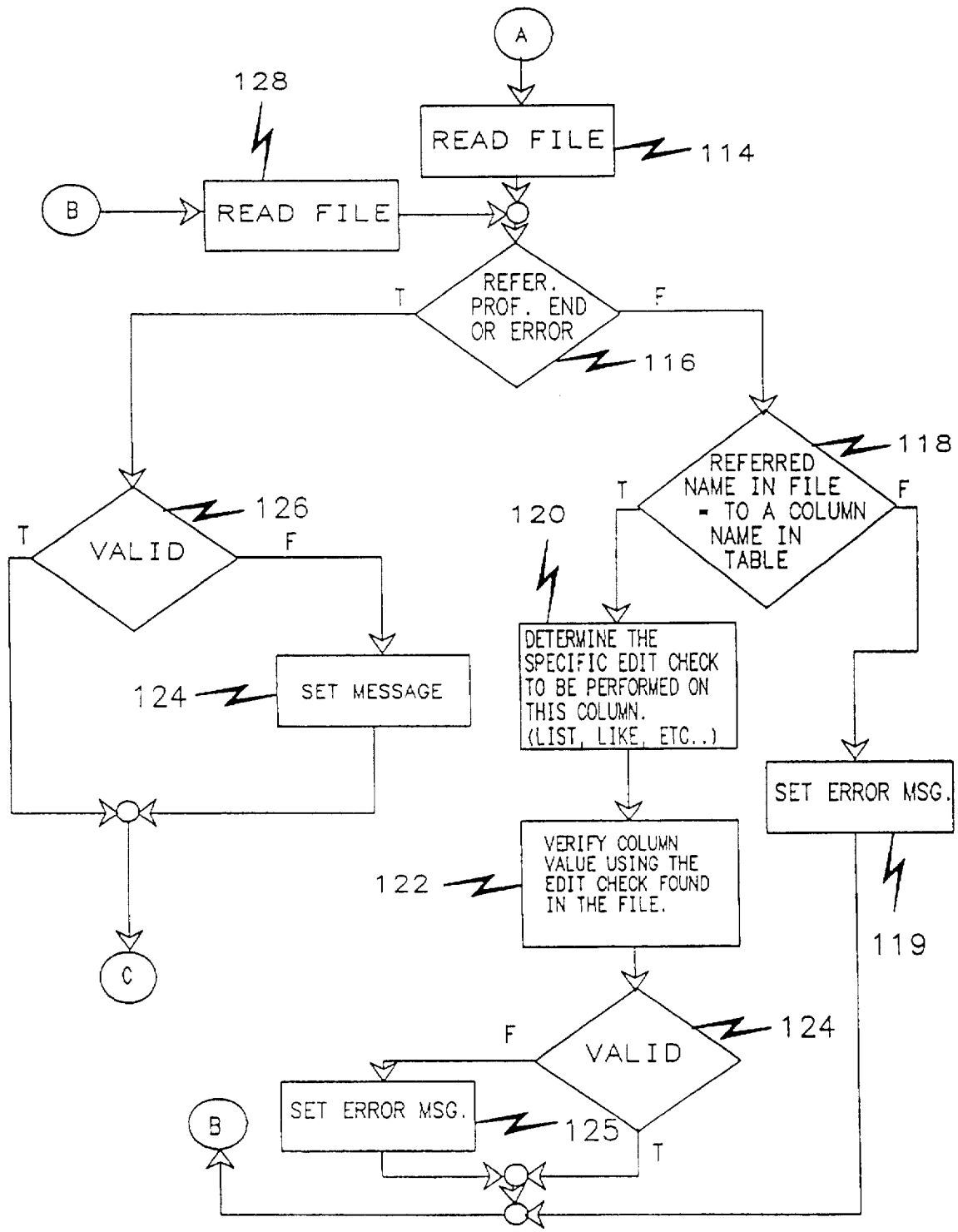

The sequence of events that are preferably carried out in the practice of the present invention is illustrated in FIGS. 1A and 1B which together represent a single flowchart of test events and conditions that are encountered during the process control operation carried out in one embodiment of the present invention. In particular, FIG. 1A illustrates that the edit session is entered (step 100). This is in distinction from other sessions that might be entered into in a data base operation such as exporting a data base or cloning a data base. Next the edit check function is evoked (step 102) and as a result, an edit check profile is read (step 104). Such a profile is typically illustrated by the contents of Table I above. A test is then made (step 106) to determine whether or not the end of the edit check profile has been reached. If it has, then processing is terminated. If it has not, a subsequent test is made (step 108) to determine whether or not any of the particular lines of an edit check profile, such as shown in Table I, includes a referential edit check. If it does not, other standard edit checks are performed and the next edit check profile record is read (step 110) and control is again passed to the test operation of test 106.

If the entry in the edit check profile indicates referential checking, as for example, by inclusion of the command key word "REFER", then the referential edit check file referred to is obtained and it is insured that this file exists (step 112). If so, this referential edit checking file is read (step 114). A test is then made (step 116) to determine whether or not an end of file (EOF) valid or error condition exists. If such is not the case, control then passes to step 118 in which the name referred to in the referential edit checking file is tested to make sure that it is equal to a column name in the table. If not, an error message is set or supplied (step 119) and control passes to step 128 for which the next referential edit check file entry is read and control passed to step 116. On the other hand if, in step 118, there is indeed a file name match, as there should be under normal conditions, then control is passed to step 120. In this step, a determination is made of the specific edit check to be formed on the indicated column. This check might be indicated as a LIST entry, a NOTLIST entry, a LIKE entry or a NOTLIKE entry. (The "LIKE" and "NOTLIKE" key word parameters are discussed more particularly below.) Next, the column value is verified using the edit check found in the referential edit checking profile (step 122). If it is determined that the value is valid, control passes on to step 128. If not, an appropriate error message is set or supplied (step 125) before control is passed to step 128.

If in step 116 an end of file or error condition exists, processing continues in step 126 wherein a more specific determination is preferably made as to the nature of the condition encountered. In the case of the end of file or error condition, a message is provided (step 127) before terminating the processing, such as by returning control to the "END" block shown in FIG. 1A.

In addition to the "LIST" and "NOTLIST" key word parameters specifiable in the referential edit checking file, it is also possible to employ so-called "wild cards". For example, the key word "LIKE" may be followed by a string such as "VM*" which may indicate that acceptable entries in the selected row and column must initially begin with the letters "V" and "M" in that order, but that subsequent characters may include any valid character entry. The "NOT-LIKE" key word specifies the nature of the field entries which are not permitted.

Lastly it is noted that it is possible for the referential edit checking file itself to contain a key word parameter such as "REFER" which might in turn contain a long list of acceptable "LIST" entries.

Attention is now directed to an overall view of a system for practicing the present invention and which more particularly illustrates data flow occurring during processing. In particular, the present invention is preferably employed on digital computer system 10 which includes memory storage system 20. Memory storage system 20 typically includes main memory or RAM portion 21 which contains program storage 25 which contains the programs which effect the functions of edit checking and tabular data updating. Computer system 10 also preferably includes second main memory portion 22 in which the tabular data preferably resides during processing though it may normally be stored on a direct access storage device (DASD) 15 which may also lie in a third portion 23 of the computer system storage system. Memory portion 22 thus includes tabular data 30 which is operated upon by edit check function 50 and which is in turn updated by update function 55. In the process of carrying out the edit checking operation, edit checker 50 accesses information from edit profile 35 (see for example Table I). Edit profile 35 also preferably includes cross linking references to referential edit profile 40. It is this latter profile which provides the significant, powerful yet flexible capabilities of an extended edit checking mechanism.

From the above, it should be appreciated that the present invention provides a feature that significantly extends editing capabilities for computer data base systems. More particularly, it is seen that the present invention extends the capability for editing in a way that helps ensure data integrity and consistency. It should also be appreciated that the relatively simple examples illustrated herein for simplicity and ease of understanding can be greatly extended in ways that are limited only by the imagination of the users and owners of data base systems. It is also seen that the present invention is particularly adapted and suited for use in full screen editing environments.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for managing tabular form data ion a computer system, said method comprising the steps of:

storing said tabular form data so as to be able to access individual rows of said data, each of said rows including data from mutiple columns;

defining, in a storage means of said computer system, a user-provided edit profile specifying at least one of said columns;

defining, also in said storage means of said computer system, a user-provided referential edit profile linked to at least one of said specified columns, said referential edit profile specifying allowable entries in at least one of said specified columns based on at least one value contained in a different column of the tabular form data; and controlling entry of user-provided data into a selected row and selected column in accordance with said allowable entries as specified by said referential edit profile.

2. The method of claim 1 in which said edit profile includes rows linking column identification indicia with entries in a referential profile whose entries define limitations for each indicated column.

3. A computer system for the management of data in tabular from said system comprising:

means for storing said tabular form data so a to be able to access individual rows of said data, each of said rows including data from multiple columns;

means for storing a user-provided edit profile which specifies at least one of said columns;

means for storing a user-provided referential edit profile linked to at least one of said specified columns, said referential edit profile specifying allowable entries in at least one of said specified columns based on at least one value contained in a different column of the tabular form data; and means for controlling entry of user-provided data into a selected row and selected column in accordance with said allowable entries as specified by said referential edit profile.

4. The system of claim 3 in which said edit profile includes rows linking column identification indicia with entries in a stored referential profile whose entries define limitations for each indicated column.

5. A method for controlling the contents of a computer memory, said method comprising the steps of:

storing, in a first portion of said computer memory, tabular data elements which are retrievable by specification of row and column indices which reference said tabular data elements;

storing, in a second portion of said computer memory, user-provided edit profile data specifying at least one of said columns;

storing, in a third portion of said computer memory, a user-provided referential edit profile linked to at least one of said specified columns, said referential edit profile specifying allowable entries with at least one of said specified columns being based on at least one value contained in a different column of the tabular form data; and editing user-provided data for entry into the contents of said specified tabular form data element under control of said referential edit profile.

* * * * *

UNITED STATES PATENT AND TRADEMARK OFFICE
CERTIFICATE OF CORRECTION

PATENT NO. : 5,778,240
DATED : July 7, 1998
INVENTOR(S) : David Alan Buchman and Kevin William Hall It is certified that error appears in the above-indentified patent and that said Letters Patent is hereby corrected as shown below:

Column 9, line 12      delete "from" and insert --form,--
Column 9, line 13      delete "a" and insert --as--

Signed and Sealed this

Twenty-sixth Day of October, 1999

Attest:

Q. TODD DICKINSON

Attesting Officer     Acting Commissioner of Patents and Trademarks